United States Patent
Malin et al.

(10) Patent No.: US 10,223,616 B1
(45) Date of Patent: Mar. 5, 2019

(54) SYSTEM AND METHOD IDENTIFICATION AND CLASSIFICATION OF INTERNET ADVERTISING

(71) Applicant: NOVNIFY LIMITED, Nicosia (CY)

(72) Inventors: Pavlo Malin, Zaporizhzhia (UA); Oleksandr Chalyi, Pryluky (UA); Oleksii Zinziuk, Kiev (UA); Volodymyr Shelest, Kiev (UA); Ivan Slieptsov, Kremennaya (UA)

(73) Assignee: FIGLEAF Limited, Nicosia (CY)

( * ) Notice: Subject to any disclaimer, the term of this patent is extended or adjusted under 35 U.S.C. 154(b) by 0 days.

(21) Appl. No.: 16/040,275

(22) Filed: Jul. 19, 2018

Related U.S. Application Data (63) Continuation-in-part of application No. 16/024,779, filed on Jun. 30, 2018.

(51) Int. Cl.
| | |
|---|---|
| G06K 9/00 | (2006.01) |
| G06K 9/62 | (2006.01) |
| G06N 3/08 | (2006.01) |
| G06F 17/30 | (2006.01) |
| G06F 17/27 | (2006.01) |

(52) U.S. Cl.
CPC ......... *G06K 9/6278* (2013.01); *G06F 17/277* (2013.01); *G06F 17/30876* (2013.01); *G06K 9/6256* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 7,840,502 | B2* | 11/2010 | Li | G06Q 30/0277 706/12 |
| 7,870,605 | B2* | 1/2011 | Hagan | G06Q 30/02 726/20 |
| 7,991,710 | B2* | 8/2011 | Palatucci | G06F 21/564 706/12 |
| 8,255,948 | B1* | 8/2012 | Black | H04N 21/234336 709/219 |
| 8,788,442 | B1* | 7/2014 | Sculley, II | G06N 99/005 706/20 |
| 9,027,140 | B1* | 5/2015 | Watkins | G06Q 30/0277 709/219 |
| 2002/0188635 | A1* | 12/2002 | Larson | G06F 17/243 715/209 |
| 2007/0198339 | A1* | 8/2007 | Shen | G06Q 30/02 705/14.64 |
| 2009/0094697 | A1* | 4/2009 | Provos | G06F 21/564 726/23 |
| 2009/0228802 | A1* | 9/2009 | Shan | G06Q 30/02 715/733 |

(Continued)

*Primary Examiner* — Shervin K Nakhjavan
(74) *Attorney, Agent, or Firm* — Inventa Capital PLC (57) ABSTRACT

A system of the present invention allows to determine the likelihood that a certain block of a web page is an advertising, such as a banner or a native advertising. The system uses combined and holistic approach to the analysis of units for the purpose of finding the advertising features (links, images and HTML code). The system does not impose any restrictions on possible ways of using it—it only provides tools for determining the probabilities of the unit belonging to the advertising or non-advertising class.

20 Claims, 1 Drawing Sheet

(56) References Cited

U.S. PATENT DOCUMENTS

| | | | |
|---|---|---|---|
| 2010/0138452 A1* | 6/2010 | Henkin | G06Q 30/02 |
| | | | 707/803 |
| 2010/0161605 A1* | 6/2010 | Gabrilovich | G06F 17/30731 |
| | | | 707/736 |
| 2011/0125587 A1* | 5/2011 | Netzer | G06Q 30/02 |
| | | | 705/14.68 |
| 2012/0159620 A1* | 6/2012 | Seifert | H04L 63/1416 |
| | | | 726/22 |
| 2014/0025497 A1* | 1/2014 | Jha | G06Q 30/02 |
| | | | 705/14.54 |
| 2017/0060986 A1* | 3/2017 | Ideses | G06F 17/30601 |
| 2017/0193545 A1* | 7/2017 | Zhou | G06Q 30/0243 |
| 2018/0204111 A1* | 7/2018 | Zadeh | G06N 3/0454 |
| 2018/0293517 A1* | 10/2018 | Browne | G06Q 10/00 |

* cited by examiner

FIGURE 1

SYSTEM AND METHOD IDENTIFICATION AND CLASSIFICATION OF INTERNET ADVERTISING

RELATED APPLICATIONS

This application is a Continuation-in-part application of and claiming priority to U.S. application Ser. No. 16/024,779, filed on Jun. 30, 2018 and entitled "SYSTEM AND METHOD FOR AUTOMATED IDENTIFICATION OF INTERNET ADVERTISING AND CREATING RULES FOR BLOCKING THE SAME", which incorporated herewith by reference in its entirety.

FIELD OF THE INVENTION

The present invention relates to system and method for identification and classification of internet advertising.

BRIEF DESCRIPTION OF THE INVENTION

The art is replete with various methods and systems for managing an advertisement and, more particularly, methods and systems for providing such management using self-learning, such as with artificial intelligence.

United States Patent Publication No. US 2003/0154126A1 to Gehlot et al. teaches a system that allows provides that data Sent from a Source computer to a recipient's computer can be selected in real time according to at least one characteristic of the recipient which can be kept in a profile. Information Such as the recipient's position, preferred websites, browsing history, content a visited website, information from a third party, or the recipient's response to a question posed also could be included in the profile, and various ways to obtain this information are disclosed. A pricing method values an advertisement Sent over the Internet according to the time the recipient viewed the advertisement, or whether the advertisement resulted in an inquiry or Sale. The advertisements can be selected in real-time and displayed with the requested web page.

United States Patent Publication No. US 2007/0233879 A1 to Woods et al. teaches a method of presenting an advertisement to a user executing content at a device is provided. A request for content is sent to a device in a peer-to-peer (P2P) network. A file is received from the P2P network. The file includes the content requested and a campaign file. The campaign file includes information identifying when and which advertisements are presented to a user during execution of the requested content. The received file is installed and the requested content is executed. A time is determined for presenting an advertisement based on information read from the campaign file. At the determined time, the advertisement is requested and presented. The advertisement itself is delivered either in advance of a request or on demand in response to a request as determined by the campaign file. The advertisement is delivered from either the content-requesting device, a peer or server in the P2P network, or a third party Internet delivery service. As an example, an Internet consumer requests a streamed video and receives as part of the stream a campaign file outlining the types of advertisements relevant to the video, and where to play them. The consumers previous requests may result in the pre-delivery of advertisements. One of these available advertisements is selected for display during the playback of the video.

United States Patent Publication No. US 2014/0068411 A1 to Ross et al. teaches a methods and apparatus to monitor usage of Internet advertising networks are disclosed. An example method includes identifying, by inspecting a Page Info interface of a browser with a processor, a first universal resource locator (URL) of a webpage displayed by the browser. A media element displayed on the webpage is identified. A second URL associated with the media element displayed on the webpage is gathered. A log of network communications to identify a request for the second URL is inspected. A referrer URL is identified within a header of the request, the referrer URL being different from the first URL. A record of the referrer URL is stored in association with the first URL.

U.S. Pat. No. 7,840,502 to Li, et al., for example, teaches an advertisement image classification system trains a binary classifier to classify images as advertisement images or non-advertisement images and then uses the binary classifier to classify images of web pages as advertisement images or non-advertisement images. During a training phase, the classification system generates training data of feature vectors representing the images and labels indicating whether an image is an advertisement image or a non-advertisement image. The classification system trains a binary classifier to classify images using training data. During a classification phase, the classification system inputs a web page with an image and generates a feature vector for the image. The classification system then applies the trained binary classifier to the feature vector to generate a score indicating whether the image is an advertisement image or a non-advertisement image.

Another prior art reference, such as U.S. Pat. No. 8,050,970 Barry, et al., teaches methods and systems that allow an Internet distribution partner of an advertisement listings provider to receive filtered and masked listings for display on the website of the Internet distribution partner. The Internet distribution partner defines filters to be applied to ranked advertising listings provided by an advertising listing provider. The advertisement listings provider system applies the filter to the listings in its database and identify matches and/or excludes matches depending on the characteristic specified. The advertisement listings provider may then send the Internet distribution partner advertisement listings based on the application of one or more filter selected by the distribution partner. Thus, the advertisement listings provider and the Internet distribution partner are able to generate additional revenue without risking the Internet distribution partner's valuable relationships with its exclusive advertisers and without jeopardizing the Internet advertising distribution partner's relationships with its end users.

U.S. Pat. No. 8,086,725 to Liang, et al., for example, teaches a method that includes receiving first electronic content configured for displaying a first page in a browser, the first electronic content including a document object model for the first page. Content in the document object model is identified as corresponding to at least one advertisement on the first page, the first page further including page content. Information is extracted from the identified content to be used in identifying an advertising network system that the advertisement links to. An identity of the advertising network system is determined using the extracted information. Second electronic content is generated using the first electronic content and the determined identity of the advertising network system. A second page including the page content of the first page and the advertisement is generated and displayed. On the second page the advertisement is labeled with the determined identity of the advertising network system.

Another reference, such as Chinese patent application number CN102663065A discloses a method for identifying and screening abnormal data of advertising positions. The method includes S10, setting quantitative evaluation indexes for the advertising positions; S11, processing and storing quantitative evaluation values of the advertising positions; S12, clustering the advertising positions, obtaining reference standard advertising positions according to a clustering result, computing the similarity of the actual advertising positions and the standard advertising positions, and finding the standard advertising positions corresponding to the actual advertising positions within the shortest distances; and S13, setting an upper limit and a lower limit according to quantiles of the standard advertising positions, computing deviation of each advertising position and screening and sorting the advertising positions according to the deviations. The various advertising positions are classified according to a clustering algorithm, subjectivity caused by industries or other manual classification modes is avoided, the similarity of the advertising positions within each category is the highest, the used distance computation method is applicable to processing qualitative indexes and quantitative indexes, dimensions are irrelevant, the deviations of the advertising positions are computed on the basis of the quintiles, and influences of extreme values on classification can be effectively avoided.

Still another prior art reference is "Content Aware Ad Blocker", developed by UC Berkeley Masters of Information and Data Science Capstone Project. This Content Aware Ad Blocker is based on so called "On-the-fly" ad blocking using machine learning techniques. To the extend effective, this Content Aware Ad Blocker has drawbacks such as use of only URL and analysis of js-scripts as data. The other drawback of this system is use of block ads on the fly without generating the rules.

Still another prior art reference is "Cloud Vision API", developed by Google. This system can classify some images as Internet advertising (classes 'banners', 'advertising') by external display, but the accuracy is not high since this system was designed as a multiclass classification, without specialization in recognition of advertising. Also, this system does not provide functions for the collection of images and data and does not take into account HTML or URL.

To the extent as being effective, there is always a need for new and improved systems and methods for blocking and filtering of network advertising.

It would therefore be desirable to have a method for determining the likelihood that a certain block of a web page is an advertising and to find out the alleged type of this advertising is a banner or a native advertising.

The present invention aims to solve this problem by simple and convenient means.

SUMMARY OF THE INVENTION

A computer-readable medium and method of the present invention are configured to store instructions that are executable by one or more processors to perform operations of identifying and classifying a web page element as Internet advertising content. The computer-readable medium and method of the present invention are configured for executing a modified convolutional neural network (CNN) image classifier of Inception V3 architecture to identify an image as an advertising banner, a native advertising, or a non-advertising, wherein identification of the image is performed, via a plurality of learning steps and a validation step, to develop a trained image model of the neural network, and wherein the neural network outputs a probability that the image is the advertising banner, the native advertising, or the non-advertising.

The computer-readable medium and method of the present invention are configured executing a uniform resource locator (URL) classifier to identify a URL link text data as an advertising link or a non-advertising link, wherein link text data identification is performed by extracting one or more features from a raw URL text to form one or more feature vectors describing the link text data by structure, and by implementing machine learning on the one or more feature vectors by using eXtreme Gradient Boosting (XGBoost) model, and wherein the model outputs a probability of the link being the advertising link or the non-advertising link. The computer-readable medium and method of the present invention are configured for executing hypertext markup language (HTML) classifier to identify an HTML code containing one or more HTML attributes as having an advertising content or a non-advertising content by extracting from the HTML code one or more tags of at least one classified HTML element contained within the code, the one or more tags comprising at least one of: a class, a HTML tag identifier (id), or a style; and splitting the one or more tags of the at least one classified HTML element by lexical separators into at least one string array, the at least one string array is processed via a bag-of-words (BoW) model for learning by Naive Bayes classifier, wherein the Naive Bayes classifier further determines a probability that the HTML code contains an attribute of the advertising or the non-advertising content.

The computer-readable medium and method of the present invention are configured executing a response combiner to collect an input from the CNN image classifier, the URL classifier and the HTML classifier, and to generate an output in terms of a probability that the web page element represented as a combination of the image, the link text data, or the HTML code of the web page element is Internet advertising content. The learning operations identify advertising images using the CNN image classifier further comprise identifying an image as an advertising banner, a native advertising, or a non-advertising by replacing Softmax layer network for 1000 outputs with Softmax layer network for 3 outputs, such that the convolutional neural network architecture is changed and dividing an initial dataset into two samples comprising a training dataset and a validation dataset, wherein the initial dataset is an array of images and the training dataset is used for learning.

The learning operations to identify advertising images using the CNN image classifier further comprise proceeding the learning in two stages, the two stages comprising a first stage and a second stage, the first stage being a transfer learning stage and the second stage being a fine-tuning stage; wherein the first stage and the second stage of the learning comprise adopting initial weights of the neural network as weight of the network trained on ImageNet dataset; keeping a number of first layers of the network fixed and training the remaining layers for the transfer learning stage, wherein the learning takes place in 50 epochs; and keeping a smaller number of first layers of the network fixed and training the remaining layers for the fine-tuning stage, wherein the learning takes place in 50 epochs.

The learning operations to identify the URL link text data as the advertising link using the URL classifier further comprise converting a raw advertising URL link text data and a raw non-advertising URL link text data into an array of N elements prior to learning and classification, wherein N is a number of one or more features describing the data;

generating a trained model by analyzing the one or more features to determine whether the link text data contains one or more words related to advertising, wherein the one or more words comprise at least one of: 'ad', 'ads', 'adblock', 'advert', 'adv', 'advertising', 'popup', 'banner', 'sponsor', 'googlead', 'googlesyndication', 'adsys', 'adser', 'conversion', 'promotions', 'promo', 'landing', 'tracking', 'track', 'affiliate', 'redirect', 'click', 'clickbank', 'aff', 'traffic', 'referal', 'offer', or 'widget', and upon determination that the link text data contains the one or more words, calculating a feature value associated with the one or more words found in the link text data, wherein each of the one or more words corresponds to a relative metrics strength value, and wherein the feature value is between 0 and infinity.

The computer-readable medium and method of the present invention are configured to analyze the one or more features to determine whether the link text data contains the one or more words followed by one or more special characters comprising at least one of: a period, a forward slash, an ampersand, an equal sign, a semicolon, a minus sign or a hyphen, or an underscore; and upon determination that the link text data contains the one or more words followed by the one or more special characters, calculating a feature value associated with the one or more special characters, wherein the feature value is between 0 and infinity.

The computer-readable medium and method of the present invention are configured in a way, wherein generation of the trained model further comprise analyzing the one or more features to determine at least one of: whether the link text data contains a character comprising a semicolon in a parameter of the link text data, and calculating a feature value associated with the character, wherein the feature value is between 0 and 1; whether the link text data contains a domain name identifying an Internet Protocol (IP) resource, and calculating a feature value associated with the domain name, wherein the feature value is between 0 and 1; whether the link text data contains a link that is external to the IP resource, and calculating a feature value associated with the link, wherein the feature value is between 0 and 1; whether the link text data contains a specification of a size in the parameter of the link text data, wherein the specification is expressed in a format of a multiplication of two numbers, each of the two numbers comprising 2 to 4 numeric digits, and calculating a feature value associated with the size, wherein the feature value is one of 0 or 1; whether the link text data contains one or more size keywords in the parameter of the link text data, wherein the one or more size keywords comprise at least one of: 'screenheight', 'screenwidth', 'browserheight', 'browserwidth', 'screendensity', 'screenresolution', 'browsertimeoffset', and upon determination that the link text data contains the one or more size keywords in the parameter, calculating a feature value associated with the one or more size keywords found in the link text data, wherein the feature value is one of 0 or 1; a proportion of one or more links followed by '.js' file loading to all links being analyzed and that are external to the IP resource, and calculating a feature value associated with the proportion, wherein the feature value is between 0 and 1; a proportion of one or more links classified as iframe source links to all links being analyzed and that are external to the IP resource, and calculating a feature value associated with the proportion, wherein the feature value is between 0 and 1; a proportion of one or more links followed by one of '.css' file loading, media file, video file, or animation file to all links being analyzed and that are external to the IP resource, and calculating a feature value associated with the proportion, wherein the feature value is between 0 and 1; and whether the link text data is classified as a iframe source link, and calculating a feature value associated with such classification, wherein the feature value is one of 0 or 1.

The generation of the trained model further comprise: analyzing the one or more features to determine at least one of: a number of parameters that follow at end of the link text data, and calculating a feature value associated with the number, wherein the feature value is between 0 and any number; whether the link text data contains a 'http' feature, and calculating feature value upon determining that the link text data contains the http feature, wherein the feature value is 0 or 1; whether the link text data contains one or more words comprising at least one of: 'utm_', 'ref', 'track', or 'id' in one or more parameters of the link text data, and calculating the feature value associated with the one or more words, wherein the feature value is 0 or 1; whether the link text data contains one or more parameters in universally unique identifier (UUID) format or as a hash word, and calculating the feature value associated with the one or more parameters, wherein the feature value is 0 or 1; whether the link text data contains a value in one or more link parameters corresponding to a typical banner size or a typical screen size, and calculating a feature value associated with the value, wherein the feature value is 0 or 1.

The learning operations to identify the URL link text data as the advertising link using the URL classifier further comprise: implementing the XGBoost model for classification of the data by transforming the link text data into the one or more feature vectors and sending the data to the trained model; and determining the probability that the link is the advertising link or the non-advertising link. Classifying operations of the HTML classifier further comprise dividing the one or more HTML attributes of the at least one string array into one or more components according to delimiting characters comprising at least one of: a comma, a period, a minus sign or a hyphen, an underscore, or an ampersand; implementing the BoW model for learning by evaluating each of the one or more components separately; and implementing the Naive Bayes classifier to output the probability that the HTML code contains the attribute of the advertising or the non-advertising content. The operations of the response combiner further comprise collecting an input from the CNN image classifier, the URL classifier and the HTML classifier in terms of probabilities; and upon receipt of a plurality of links, images, or HTML codes, determining an aggregate response that that the web page element represented as a combination of the image, the link text data, or the HTML code of the web page element is Internet advertising content An advantage of the present invention is to provide system and method is a combined and holistic approach to the analysis of units for the purpose of finding the advertising features (links, images and HTML code). At the same time, the module does not impose any restrictions on possible ways of using it—it only provides tools for determining the probabilities of the unit belonging to the advertising or non-advertising class.

Another advantage of the present invention is to provide system and method using modern methods of machine learning to recognize (classify) images together with heuristic modules for finding ad markers in HTML elements and in URL allows achieving high accuracy in the identification of advertising elements on a web page.

The objects and advantages of the present invention will be more readily apparent from inspection of the following specification, taken in connection with the accompanying drawing, wherein like numerals refer to like parts throughout and in which an embodiment of the present invention is described and illustrated.

The exact manner in which the foregoing and other objects and advantages of the invention are achieved in practice will become more clearly apparent when reference is made to the following detailed description of the preferred embodiments of the invention described in detail in the following specification and shown in the accompanying drawings, where in like reference numbers indicate corresponding parts throughout.

Combined and comprehensive approach to the analysis of blocks for advertising features: analysis of the visual image of the block, links added to the block and its html code. This integrated approach allowed achieving high accuracy in the ad block automatic identification.

The image analysis uses a convolutional neural network (CNN). Most often, such neural networks are used to classify images by given classes. However, the "advertising image" concept is a very abstract one, and it is difficult to define the "advertising" class in advance. This paper specifies how to apply CNN for the classification of even such an abstract class as "advertising." In the process of learning, this network independently forms the criteria (signs), by which it distinguishes the "advertising" images from "non-advertising" ones. Thus, there is no pre-limited list of features for analysis—this allows the system to be as adaptive as possible to new types of advertising, as well as to find these signs in an automatic mode (without human assistance), the network itself forms signs during training.

The module, apart from distinguishing between "advertising" and "non-advertising", can also automatically determine the type of advertising: native advertising and banner advertising.

Advertising blocks differ in general from the non-advertising content of a web-site. However, automatic ads finding on a web-site is a non-trivial task. Most commonly, the search for new advertising (or new advertisement network) is now carried out by many people with a low level of search automation.

This is time-consuming, poorly scalable, and requires significant human resources. This invention implements an integrated approach to the analysis of web-site blocks, which allows automatically answering the question whether a certain block is an "advertising" or "non-advertising" one.

The received positive answers can be further used for various purposes: ad blocking, analytics, collection of statistics on posted advertising, etc. Herewith, the invention does not impose any restrictions on possible ways of its application—it only provides tools for determining the probability that a block belongs to either an advertising or non-advertising class.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Referring back to FIG. 1, a system and method of the present invention is used for identification and classification of Internet advertising and allows to determine the likelihood that a certain block of a web page is an advertising and also allows to identify type of this advertising, i.e. a banner or a native advertising. The computer-implemented system of the present invention is generally shown at 10 in FIG. 1. The system 10 is used for identification and classification of web-based advertising. The system 10 includes a module 12 that is DOM element from report that includes source web page, images, html, and url.

Figure 1:
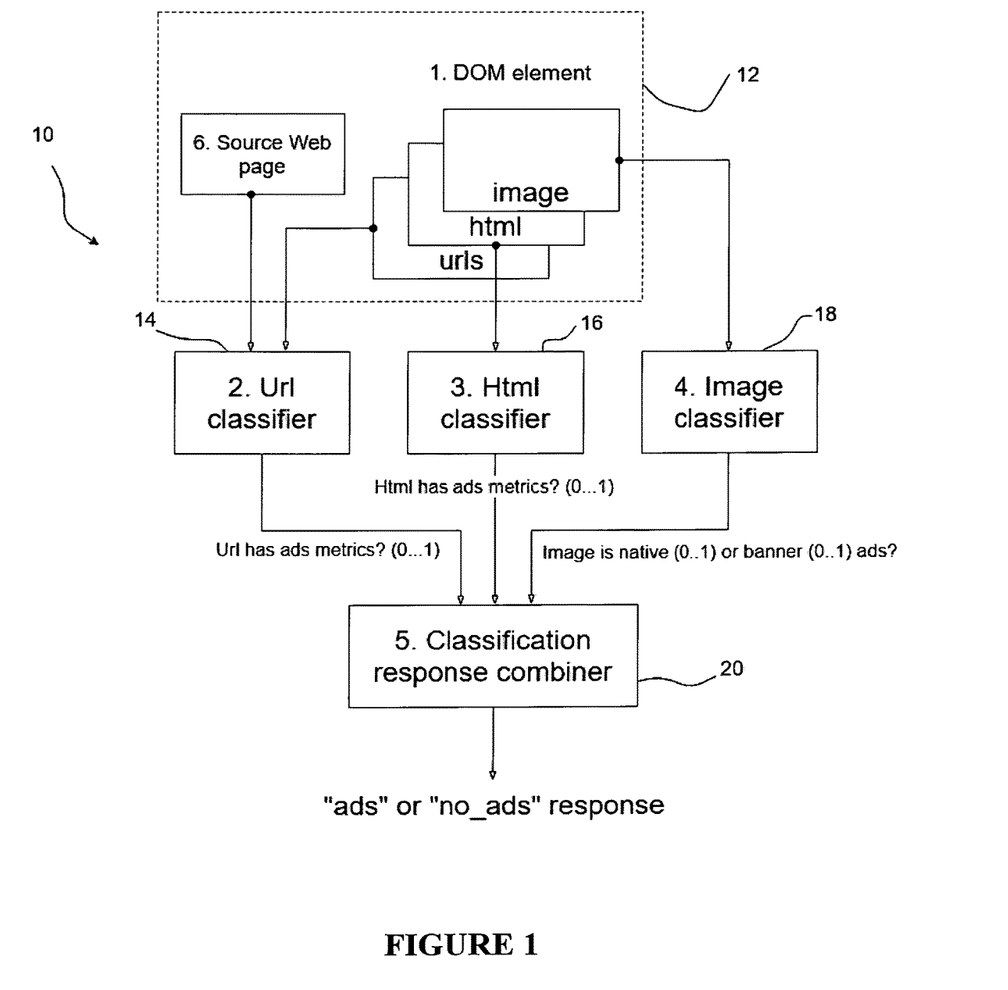
FIG. 1 illustrates a schematic view of a system used for identification and classification of Internet advertising

The computer-implemented system 10 includes an image classifier module 18 to identify advertising images using CNN based on the Inception V3 architecture and an Url classifier module 14 adaptable to determine if the advertising images is advertising and non-advertising. The computer-implemented system also includes an Html classifier module 16 providing strings that are the values of the HTML tags id, class, style of all HTML elements contained inside unit that is classified, wherein the string arrays are divided into 2 classes: advertising and non-advertising and each element of the array is divided into parts by delimiting characters: ',', '.', '–', '_', '&', wherein each unit to be classified is represented by an array of similar words without special symbols.

The computer-implemented system 10 includes a classifications response combiner module 20, wherein input data of the classifications response combiner module 20 is the responses of previous classifiers configured to determine if the image is a banner advertising from the image classifier module, the image is a native advertising from the image classifier module, that links inside the unit contain advertising features from the Url classifier module 14, that HTML unit contains advertising features from the Html classifier module 16.

Alluding to the above, the source of any ad unit on the web page is the HTML code of this unit, which after rendering by the browser is displayed as an image on the monitor with the possibility of interaction (for example, a click on the ad unit redirects to the product page). Also an important element of the ad units are links within such units: both the links for image (ad banner) loading, and the links followed after clicking on the banner.

Advertising units most often differ from non-advertising ones by the following features. Advertising images (banners) are different from others, since the task of any advertising is to attract the user's attention (brighter colors and contrasts, template layout of elements and text, more contrasting fonts). Advertising links carry a lot of specific parameters necessary for correct display to a specific user, and for correct tracking of the navigation through such links. Website coding (HTML code) is done so that each unit has a name/style that reflects its purpose. Therefore, the tag values (such as id, class, style) in ad units will be associated with advertising topics. For example: advertise, ads container, ad-block. Thus, three important elements of ad units are: advertising image (banner), links within the ad unit and HTML tag names within the ad units.

The input data are: the unit image, the links within the unit, the unit tag names (each type of data is sent to its classifier type); the output data of the module is the probability that this unit is advertising. The image classifier module 18 is used is the modified convolutional neural network (CNN) of the Inception V3 architecture. The way to identify advertising images using CNN based on the Inception V3 architecture consists of the following steps.

The initial data (datasets) for learning are an array of images divided into three groups: banners, native advertising, non-advertising. The division of the general "advertising" class into two classes: banners and native—allowed achieving greater accuracy, as the specificity of displaying native advertising is taken into account, and also avoiding the problem of distortion of results during learning due to unbalanced data (the number of instances in the banner and native class differs).

The network architecture was changed in such a way as to correspond to the task of classifying into three classes: banners, native, no_ads. To do this, the output layer of the Softmax layer network for 1000 outputs (classes) was replaced by the Softmax layer for 3 outputs (corresponding to three classes). For learning, the original data set was divided into two samples: train and validation datasets. For the validation sample, 2000 images were taken from the original dataset.

During learning the first layers of the network were not trained, as they are designed to extract the most common image features (such as lines, triangles, circles, etc.) and such attributes are common for any image recognition task. Therefore, we took the initial weights of this network as the weight of the network trained on the ImageNet dataset (this dataset consists of 1000 classes of 1000 objects each). This made it possible to significantly speed up the network learning and to use a relatively small dataset during the learning.

Before recognition and learning, the images are reduced to the size 299×299 to match the architecture of the Inception V3 network. The learning used the data augmentation such as Horizontal image shift by a random value of up to 20%, Vertical image shift by a random value of up to 20%, and zoom to a random value of up to 20%.

The learning consists of two stages. The first stage is "transfer learning". At this stage, the weights of the first 310 layers of the neural network are fixed, and the remaining layers are trained. Optimization algorithm is 'rmsprop', loss function is 'categorical_crossentropy'. For such learning a "package" of 64 images (mini-batch gradient descent) is used. The learning takes place in 50 epochs (i.e., all images pass 50 times through the neural network during the learning, adjusting the weights). The second stage of learning is "fine tuning".

At this stage, the weights of the first 172 layers of the neural network are fixed, and the remaining layers are trained. Optimizer is SGD (lr=0.0001, momentum=0.9), loss function is 'categorical_crossentropy'. "Package" of images is also equal to 64. The number of epochs is also 50. The output model is taken from the epoch, which showed the maximum accuracy on the validation sample. For recognition (classification), the image is transformed into a 3D array: pixel position X, pixel position Y, color. This array is sent to a trained model of the neural network, and the network outputs the probability that this image belongs to a certain class as: banner: 0.73, native: 0.1, no_ads: 0.17.

The Url classifier module 14 is configured in such way wherein initial data for learning is two arrays of links: advertising and non-advertising. For computer learning on the text data, a feature vector needs to be selected from them that will describe the data by structure. Each row from the array (both advertising and non-advertising) will be converted into an array of N elements before learning and classification, where N is the number of features that describe the data. The following features are used in this module. Does the link contain one of the words related to advertising: 'ad', 'advert', 'popup', 'banner', 'sponsor', 'iframe', 'googlead', 'adsys', 'adser', 'container', 'native', 'promotions', 'tracking'? The feature value is 0 or 1 (if the link contains one of the specified words). Does the link contain the words from feature 1, followed by one of the special characters: '.', '/', '&', '=', ';', '_'? For example: 'ad_', 'adser.data'. The feature value is 0 or 1. Does the link contain the character ';' in the parameters? Parameters of standard links are usually separated by '&', sign, but in advertising links a lot of parameters are separated by ';'. The feature value is 0 or 1. Does the link in the parameters contain the domain name where it was found? The feature value is 0 or 1. Is the link external in the context of the site where it was found? The link is called external if the link domain does not contain the domain name where it was found. The feature value is 0 or 1. Does the link in the parameters specify a size in the number×number format, while the number should consist of 2-4 numeric digits, for example: 200×200, 90×15, with the sign being negative in the case of 1×1, 200×9? The feature value is 0 or 1. Does the link in the parameters contain one of the size keywords: 'screenheight', 'screenwidth', 'browserheight','browserwidth', 'screendensity', 'screenresolution', 'browsertimeoffset'? The feature value is 0 or 1. What proportion of the links to js-scripts (the link followed by .js file loading) on the page where the link was found is external (see Description of "external" in paragraph 5)? It is calculated as the number of external links to js files divided by the number of all links to js files on the page. The feature value is within [0 . . . 1].

What proportion of the links that are the iframe source (the link is the source of HTML element of the iframe) on the page where the reference was found is external? It is calculated as the number of external iframe links-sources divided by the number of all iframe links-sources on the page. The feature value is within [0 . . . 1]. What proportion of the links to the resources (the link followed by loading of .css file or any media file—image, video, animation) on the page where the link was found is external?

It is calculated as the number of external links to resource files divided by the number of all links to resource files on the page. The value of the characteristic is within [0 . . . 1]. Is the link the iframe source? The feature value is 0 or 1. The number of parameters that are passed by the link. In general, the link parameters are passed at the end of the link, beginning with '?' and each parameter is separated by '&'. The feature value is from 0 to any natural number.

Does the link contain the word 'http' in the parameters? The feature value is 0 or 1. Does the link contain one of the words 'utm_', 'ref', 'track', 'id' in the parameters? The feature value is 0 or 1. Does the link contain the parameters in UUID format or as a hash word? Hash word is a numerical-alphabetic sequence of at least 20 characters long without delimiters (punctuation marks, special characters). The feature value is 0 or 1.

Do the link parameters contain a value that corresponds to the typical banner size or screen size, for example: 800, 1080, 1440, 300, 720? The feature value is 0 or 1.

As a classifier model, XGBoost gradient-boosting model is used. For classification, the link is transformed into a feature vector and sent to the trained model, at the output: the probability that the link is advertising. Since there are usually several links in the unit, then at the classifier output there is an array of probabilities from which the maximum probability value is taken.

The Html classifier module 16 receives initial data in an array of strings that are the values of the HTML tags id, class, style of all HTML elements contained inside the unit that is classified. These string arrays are divided into 2 classes: advertising and non-advertising. Then each element of the array is divided into parts by delimiting characters: ',', '.', '-', '_', '&'. For example, if the element has the value "ad_label_method", then at the output of the division we get the values: "ad", "label", "method". In the final form, any unit that can be classified is represented by an array of similar words without special symbols.

For learning, we use the bag-of-words approach (the model that does not take into account the context of words altogether, but evaluates each component of the original word), and the Naive Bayes Classifier was chosen as the classifier. The result of the classifier operation is the probability that this set of tag values contains attributes of advertising.

The classifications response combiner module 20 includes an input data such as responses of previous classifiers: probability that the image is a banner advertising from the image classifier module 14, probability that the image is a native advertising from the image classifier module 14, probability that links inside the unit contain advertising features from the Url classifier module 14, probability that HTML unit contains advertising features from the Html classifier module 16. As the classifier model, a XGBoost gradient-boosting model was used. At the output, in the end, the probability that this unit is Internet advertising is received.

Each type of data gets to its own classifier type. Since there are usually a lot of links (URL) and HTML elements, as responses of these modules (URL classification module and HTML classification module), the system picks the response with the maximum probability of belonging to the advertising class. For example, if 3 links were sent, the link classification module gives the response [0.1, 0.83, 0.34]—then the final response of the link classification module will be 0.83. Similarly, the HTML classification module behaves.

Classification is made according to the rules described above, and the final response of the entire module (taking into account the results of the response aggregation module) is the probability that the web page element under classification belongs to the "advertising" class.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A non-transitory computer-readable medium configured to store instructions that are executable by one or more processors to perform operations of identifying and classifying a web page element as Internet advertising content comprising:

executing a modified convolutional neural network (CNN) image classifier of Inception V3 architecture to identify an image as an advertising banner, a native advertising, or a non-advertising, wherein identification of the image is performed, via a plurality of learning steps and a validation step, to develop a trained image model of the neural network, and wherein the neural network outputs a probability that the image is the advertising banner, the native advertising, or the non-advertising;

executing a uniform resource locator (URL) classifier to identify a URL link text data as an advertising link or a non-advertising link, wherein link text data identification is performed by extracting one or more features from a raw URL text to form one or more feature vectors describing the link text data by structure, and by implementing machine learning on the one or more feature vectors by using eXtreme Gradient Boosting (XGBoost) model, and wherein the model outputs a probability of the link being the advertising link or the non-advertising link;

executing hypertext markup language (HTML) classifier to identify an HTML code containing one or more HTML attributes as having an advertising content or a non-advertising content by extracting from the HTML code one or more tags of at least one classified HTML element contained within the code, the one or more tags comprising at least one of:
  a class,
  a HTML tag identifier (id), or
  a style; and
  splitting the one or more tags of the at least one classified HTML element by lexical separators into at least one string array, the at least one string array is processed via a bag-of-words (BoW) model for learning by Naive Bayes classifier, wherein the Naive Bayes classifier further determines a probability that the HTML code contains an attribute of the advertising or the non-advertising content; and executing a response combiner to collect an input from the CNN image classifier, the URL classifier and the HTML classifier, and to generate an output in terms of a probability that the web page element represented as a combination of the image, the link text data, or the HTML code of the web page element is Internet advertising content.

2. The non-transitory computer-readable medium of claim 1, wherein the learning operations to identify advertising images using the CNN image classifier further comprise:

identifying an image as an advertising banner, a native advertising, or a non-advertising by replacing Softmax layer network for 1000 outputs with Softmax layer network for 3 outputs, such that the convolutional neural network architecture is changed;

dividing an initial dataset into two samples comprising a training dataset and a validation dataset, wherein the initial dataset is an array of images and the training dataset is used for learning.

3. The non-transitory computer-readable medium of claim 2, wherein the learning operations to identify advertising images using the CNN image classifier further comprise:

proceeding the learning in two stages, the two stages comprising a first stage and a second stage, the first stage being a transfer learning stage and the second stage being a fine-tuning stage; wherein the first stage and the second stage of the learning comprise:

adopting initial weights of the neural network as weight of the network trained on ImageNet dataset;

keeping a number of first layers of the network fixed and training the remaining layers for the transfer learning stage, wherein the learning takes place in 50 epochs; and keeping a smaller number of first layers of the network fixed and training the remaining layers for the fine-tuning stage, wherein the learning takes place in 50 epochs.

4. The non-transitory computer-readable medium of claim 1, wherein the learning operations to identify the URL link text data as the advertising link using the URL classifier further comprise:

converting a raw advertising URL link text data and a raw non-advertising URL link text data into an array of N elements prior to learning and classification, wherein N is a number of one or more features describing the data;

generating a trained model by analyzing the one or more features to determine:

whether the link text data contains one or more words related to advertising, wherein the one or more words comprise at least one of: 'ad', 'ads', 'adblock', 'advert', 'adv', 'advertising', 'popup', 'banner', 'sponsor', 'googlead', 'googlesyndication', ' adsys', 'adser', 'conversion', 'promotions', 'promo', 'landing', 'tracking', 'track', 'affiliate', 'redirect', 'click', 'clickbank', 'aff', 'traffic', 'referal', 'offer', or 'widget', and upon determination that the link text data contains the one or more words, calculating a feature value associated with the one or more words found in the link text data, wherein each of the one or more words corresponds to a relative metrics strength value, and wherein the feature value is between 0 and infinity.

5. The non-transitory computer-readable medium of claim 4, wherein generation of the trained model further comprise:

analyzing the one or more features to determine:

whether the link text data contains the one or more words followed by one or more special characters comprising at least one of: a period, a forward slash, an ampersand, an equal sign, a semicolon, a minus sign or a hyphen, or an underscore; and upon determination that the link text data contains the one or more words followed by the one or more special characters, calculating a feature value associated with the one or more special characters, wherein the feature value is between 0 and infinity.

6. The non-transitory computer-readable medium of claim 4, wherein generation of the trained model further comprise:

analyzing the one or more features to determine at least one of:

whether the link text data contains a character comprising a semicolon in a parameter of the link text data, and calculating a feature value associated with the character, wherein the feature value is between 0 and 1;

whether the link text data contains a domain name identifying an Internet Protocol (IP) resource, and calculating a feature value associated with the domain name, wherein the feature value is between 0 and 1;

whether the link text data contains a link that is external to the IP resource, and calculating a feature value associated with the link, wherein the feature value is between 0 and 1;

whether the link text data contains a specification of a size in the parameter of the link text data, wherein the specification is expressed in a format of a multiplication of two numbers, each of the two numbers comprising 2 to 4 numeric digits, and calculating a feature value associated with the size, wherein the feature value is one of 0 or 1;

whether the link text data contains one or more size keywords in the parameter of the link text data, wherein the one or more size keywords comprise at least one of: 'screenheight', 'screenwidth', 'browserheight', 'browserwidth', 'screendensity', 'screenresolution', 'browsertimeoffset', and upon determination that the link text data contains the one or more size keywords in the parameter, calculating a feature value associated with the one or more size keywords found in the link text data, wherein the feature value is one of 0 or 1;

a proportion of one or more links followed by '.js' file loading to all links being analyzed and that are external to the IP resource, and calculating a feature value associated with the proportion, wherein the feature value is between 0 and 1;

a proportion of one or more links classified as iframe source links to all links being analyzed and that are external to the IP resource, and calculating a feature value associated with the proportion, wherein the feature value is between 0 and 1;

a proportion of one or more links followed by one of '.css' file loading, media file, video file, or animation file to all links being analyzed and that are external to the IP resource, and calculating a feature value associated with the proportion, wherein the feature value is between 0 and 1; and whether the link text data is classified as a iframe source link, and calculating a feature value associated with such classification, wherein the feature value is one of 0 or 1.

7. The non-transitory computer-readable medium of claim 4, wherein generation of the trained model further comprise:

analyzing the one or more features to determine at least one of:

a number of parameters that follow at end of the link text data, and calculating a feature value associated with the number, wherein the feature value is between 0 and any number;

whether the link text data contains a 'http' feature, and calculating feature value upon determining that the link text data contains the http feature, wherein the feature value is 0 or 1;

whether the link text data contains one or more words comprising at least one of:

'utm_', 'ref', 'track', or 'id' in one or more parameters of the link text data, and calculating the feature value associated with the one or more words, wherein the feature value is 0 or 1;

whether the link text data contains one or more parameters in universally unique identifier (UUID) format or as a hash word, and calculating the feature value associated with the one or more parameters, wherein the feature value is 0 or 1;

whether the link text data contains a value in one or more link parameters corresponding to a typical banner size or a typical screen size, and calculating a feature value associated with the value, wherein the feature value is 0 or 1.

8. The non-transitory computer-readable medium of claim 4, wherein the learning operations to identify the URL link text data as the advertising link using the URL classifier further comprise:

implementing the XGBoost model for classification of the data by transforming the link text data into the one or more feature vectors and sending the data to the trained model; and determining the probability that the link is the advertising link or the non-advertising link.

9. The non-transitory computer-readable medium of claim 1, wherein classifying operations of the HTML classifier further comprise:

dividing the one or more HTML attributes of the at least one string array into one or more components according to delimiting characters comprising at least one of: a comma, a period, a minus sign or a hyphen, an underscore, or an ampersand;

implementing the BoW model for learning by evaluating each of the one or more components separately; and implementing the Naive Bayes classifier to output the probability that the HTML code contains the attribute of the advertising or the non-advertising content.

10. The non-transitory computer-readable medium of claim 1, wherein the operations of the response combiner further comprise:

collecting an input from the CNN image classifier, the URL classifier and the HTML classifier in terms of probabilities; and upon receipt of a plurality of links, images, or HTML codes, determining an aggregate response that at least one of the links, the images, or the HTML code belong to an advertising class.

11. A method configured to store instructions that are executable by one or more processors to perform operations of identifying and classifying a web page element as Internet advertising content, the method comprising the steps of:

executing a modified convolutional neural network (CNN) image classifier of Inception V3 architecture to identify an image as an advertising banner, a native advertising, or a non-advertising, wherein identification of the image is performed, via a plurality of learning steps and a validation step, to develop a trained image model of the neural network, and wherein the neural network outputs a probability that the image is the advertising banner, the native advertising, or the non-advertising;

executing a uniform resource locator (URL) classifier to identify a URL link text data as an advertising link or a non-advertising link, wherein link text data identification is performed by extracting one or more features from a raw URL text to form one or more feature vectors describing the link text data by structure, and by implementing machine learning on the one or more feature vectors by using eXtreme Gradient Boosting (XGBoost) model, and wherein the model outputs a probability of the link being the advertising link or the non-advertising link;

executing hypertext markup language (HTML) classifier to identify an HTML code containing one or more HTML attributes as having an advertising content or a non-advertising content by extracting from the HTML code one or more tags of at least one classified HTML element contained within the code, the one or more tags comprising at least one of:

a class, a HTML tag identifier (id), or a style; and splitting the one or more tags of the at least one classified HTML element by lexical separators into at least one string array, the at least one string array is processed via a bag-of-words (BoW) model for learning by Naive Bayes classifier, wherein the Naive Bayes classifier further determines a probability that the HTML code contains an attribute of the advertising or the non-advertising content; and executing a response combiner to collect an input from the CNN image classifier, the URL classifier and the HTML classifier, and to generate an output in terms of a probability that the web page element represented as a combination of the image, the link text data, or the HTML code of the web page element is Internet advertising content.

12. The method of claim 11, wherein the learning operations to identify advertising images using the CNN image classifier further comprise:

identifying an image as an advertising banner, a native advertising, or a non-advertising by replacing Softmax layer network for 1000 outputs with Softmax layer network for 3 outputs, such that the convolutional neural network architecture is changed;

dividing an initial dataset into two samples comprising a training dataset and a validation dataset, wherein the initial dataset is an array of images and the training dataset is used for learning.

13. The method of claim 12, wherein the learning operations to identify advertising images using the CNN image classifier further comprise:

proceeding the learning in two stages, the two stages comprising a first stage and a second stage, the first stage being a transfer learning stage and the second stage being a fine-tuning stage; wherein the first stage and the second stage of the learning comprise:

adopting initial weights of the neural network as weight of the network trained on ImageNet dataset;

keeping a number of first layers of the network fixed and training the remaining layers for the transfer learning stage, wherein the learning takes place in 50 epochs; and keeping a smaller number of first layers of the network fixed and training the remaining layers for the fine-tuning stage, wherein the learning takes place in 50 epochs.

14. The method of claim 11, wherein the learning operations to identify the URL link text data as the advertising link using the URL classifier further comprise:

converting a raw advertising URL link text data and a raw non-advertising URL link text data into an array of N elements prior to learning and classification, wherein N is a number of one or more features describing the data;

generating a trained model by analyzing the one or more features to determine:

whether the link text data contains one or more words related to advertising, wherein the one or more words comprise at least one of: 'ad', 'ads', 'adblock', 'advert', 'adv', 'advertising', 'popup', 'banner', 'sponsor', 'googlead', 'googlesyndication', ' adsys', 'adser', 'conversion', 'promotions', 'promo', 'landing', 'tracking', 'track', 'affiliate', 'redirect', 'click', 'clickbank', 'aff', 'traffic', 'referal', 'offer', or 'widget', and upon determination that the link text data contains the one or more words, calculating a feature value associated with the one or more words found in the link text data, wherein each of the one or more words corresponds to a relative metrics strength value, and wherein the feature value is between 0 and infinity.

15. The method of claim 14, wherein generation of the trained model further comprise:
analyzing the one or more features to determine:
whether the link text data contains the one or more words followed by one or more special characters comprising at least one of: a period, a forward slash, an ampersand, an equal sign, a semicolon, a minus sign or a hyphen, or an underscore; and
upon determination that the link text data contains the one or more words followed by the one or more special characters, calculating a feature value associated with the one or more special characters, wherein the feature value is between 0 and infinity.

16. The method of claim 14, wherein generation of the trained model further comprise:
analyzing the one or more features to determine at least one of:
whether the link text data contains a character comprising a semicolon in a parameter of the link text data, and calculating a feature value associated with the character, wherein the feature value is between 0 and 1;
whether the link text data contains a domain name identifying an Internet Protocol (IP) resource, and calculating a feature value associated with the domain name, wherein the feature value is between 0 and 1;
whether the link text data contains a link that is external to the IP resource, and calculating a feature value associated with the link, wherein the feature value is between 0 and 1;
whether the link text data contains a specification of a size in the parameter of the link text data, wherein the specification is expressed in a format of a multiplication of two numbers, each of the two numbers comprising 2 to 4 numeric digits, and calculating a feature value associated with the size, wherein the feature value is one of 0 or 1;
whether the link text data contains one or more size keywords in the parameter of the link text data, wherein the one or more size keywords comprise at least one of: 'screenheight', 'screenwidth', 'browserheight', 'browserwidth', 'screendensity', 'screenresolution', 'browsertimeoffset', and upon determination that the link text data contains the one or more size keywords in the parameter, calculating a feature value associated with the one or more size keywords found in the link text data, wherein the feature value is one of 0 or 1;
a proportion of one or more links followed by '.js' file loading to all links being analyzed and that are external to the IP resource, and calculating a feature value associated with the proportion, wherein the feature value is between 0 and 1;
a proportion of one or more links classified as iframe source links to all links being analyzed and that are external to the IP resource, and calculating a feature value associated with the proportion, wherein the feature value is between 0 and 1;
a proportion of one or more links followed by one of '.css' file loading, media file, video file, or animation file to all links being analyzed and that are external to the IP resource, and calculating a feature value associated with the proportion, wherein the feature value is between 0 and 1; and
whether the link text data is classified as a iframe source link, and calculating a feature value associated with such classification, wherein the feature value is one of 0 or 1.

17. The method of claim 14, wherein generation of the trained model further comprise:
analyzing the one or more features to determine at least one of:
a number of parameters that follow at end of the link text data, and calculating a feature value associated with the number, wherein the feature value is between 0 and any number;
whether the link text data contains a 'http' feature, and calculating feature value upon determining that the link text data contains the http feature, wherein the feature value is 0 or 1;
whether the link text data contains one or more words comprising at least one of:
'utm_', 'ref', 'track', or 'id' in one or more parameters of the link text data, and calculating the feature value associated with the one or more words, wherein the feature value is 0 or 1;
whether the link text data contains one or more parameters in universally unique identifier (UUID) format or as a hash word, and calculating the feature value associated with the one or more parameters, wherein the feature value is 0 or 1;
whether the link text data contains a value in one or more link parameters corresponding to a typical banner size or a typical screen size, and calculating a feature value associated with the value, wherein the feature value is 0 or 1.

18. The method of claim 14, wherein the learning operations to identify the URL link text data as the advertising link using the URL classifier further comprise:
implementing the XGBoost model for classification of the data by transforming the link text data into the one or more feature vectors and sending the data to the trained model; and
determining the probability that the link is the advertising link or the non-advertising link.

19. The method of claim 11, wherein classifying operations of the HTML classifier further comprise:
dividing the one or more HTML attributes of the at least one string array into one or more components according to delimiting characters comprising at least one of: a comma, a period, a minus sign or a hyphen, an underscore, or an ampersand;
implementing the BoW model for learning by evaluating each of the one or more components separately; and
implementing the Naive Bayes classifier to output the probability that the HTML code contains the attribute of the advertising or the non-advertising content.

20. The method of claim 11, wherein the operations of the response combiner further comprise:
collecting an input from the CNN image classifier, the URL classifier and the HTML classifier in terms of probabilities; and upon receipt of a plurality of links, images, or HTML codes, determining an aggregate response that at least one of the links, the images, or the HTML code belong to an advertising class.

* * * * *